July 29, 1969  M. HINDEN  3,457,849
MOTORIZED DAMPER ASSEMBLY FOR DUCTS OF VARYING WIDTHS
Filed Feb. 14, 1968

INVENTOR.
MILTON HINDEN
BY
Mark Basreches
ATTORNEY

United States Patent Office 3,457,849
Patented July 29, 1969

---

3,457,849
MOTORIZED DAMPER ASSEMBLY FOR DUCTS OF VARYING WIDTHS
Milton Hinden, 15 Bay Link,
Massapequa, N.Y. 11758
Filed Feb. 14, 1968, Ser. No. 705,384
Int. Cl. F24f *13/10;* F16k *1/22*
U.S. Cl. 98—110       6 Claims

ABSTRACT OF THE DISCLOSURE

A motorized damper assembly for ducts of varying widths characterized by a mounting flange carrying a damper support bracket, the bracket and damper blade being extensible to permit mounting in ducts of varying dimensions.

BACKGROUND OF THE INVENTION

Field of the invention

This invention is in the field of dampers for duct systems, such as air conditioning and heating systems.

Description of the prior art

In air conduction systems it is known to provide dampers to regulate the flow of warm or cold air in the various trunk and branch ducts of the system. Often it is desired to regulate the proportions of flow to the various branches. For this purpose it is customary to incorporate a series of dampers in the branches and/or trunks of the system, which dampers are independently operable selectively to admit, to limit or to block the flow of air to the duct components downstream of the damper.

It is likewise known that such dampers may be either manually operated or motorized.

The installation of motorized dampers, particularly where such installation has been required to be effected at the job site, has been a relatively time consuming operation. Where it is desired to install a motorized damper in an already existing duct system, it is often necessary to remove a complete narrow section of duct and replace it by a supplemental framing section for accommodation of the damper device.

The operation has been further complicated by the requirement that access be available to both sides of the duct in which the damper is to be installed, to permit attachment of the damper control means at one side and the damper bearing support at the other.

In prior art dampers, it has been necessary for suppliers to maintain stocks of a wide range of damper sizes, to correspond with the range of available duct sizes.

SUMMARY OF THE INVENTION

An integral, motorized damper assembly insertible endwise through the aperture defined in a single wall of a damper and adjustable to fit ducts of a variety of widthwise dimensions, comprising a mounting flange carrying a damper operator motor on one side of the flange and a damper on the other side of the flange, the damper being drivingly connected to the motor, the damper and damper support assembly being extensible to permit its accommodation to ducts of a wide variety of widths.

It is accordingly an object of the invention to provide an integral motorized damper assembly capable of being attached to a duct by affixation of the operator assembly components to one wall only of the duct.

A further object of the invention is the provision of an improved motorized damper device which is transversely extensible within the duct proper, to permit its accommodation to ducts of a variety of widths.

A further object of the invention is the provision of a damper assembly of the type described wherein the transverse or widthwise extension may be effected entirely from outside the duct and may be accomplished after the assembly is mounted in the duct.

To attain these objects and such further objects as may appear herein or be hereinafter pointed out, reference is made to the accompanying drawings forming a part hereof, in which.

Figure 1:
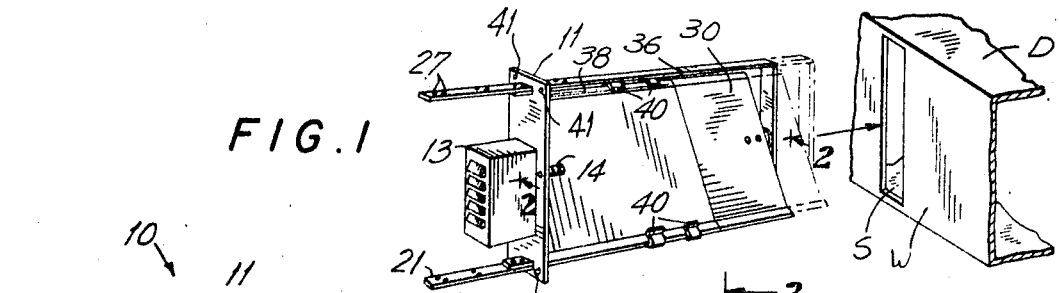
FIGURE 1 is a perspective view of a motorized damper assembly in accordance with the invention, shown in conjunction with a duct section which has been prepared to accommodate the damper assembly.
Figure 2:
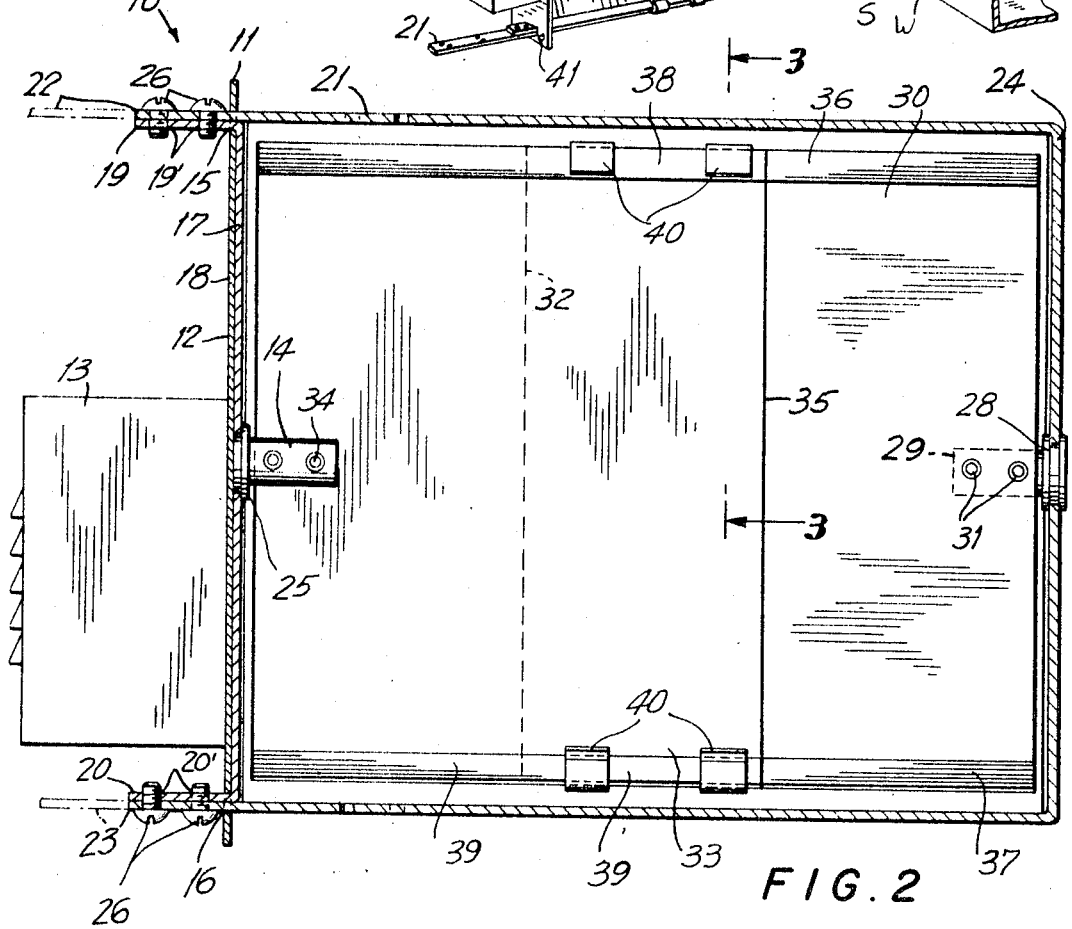
FIGURE 2 is a magnified vertical section taken on the line 2—2 of FIGURE 1.

In accordance with the invention, a motorized damper assembly 10 comprises a mounting plate or flange 11 carrying on its outer side 12 a damper drive housing 13. Within the housing 13 is carried a drive motor and geared speed reducer, the speed reducer terminating in a drive shaft 14 extending through an aperture formed in the flange 11.

The flange 11 is provided with a pair of spaced slots 15, 16 disposed substantially equidistant from the drive shaft 14. An outer U-shaped bracket 17 is fixed to the inner surface or face 18 of the flange 11, as by spot welding or the like. The outer bracket 17 includes spaced leg portions 19, 20 which extend outwardly through the slots 15, 16, respectively. An inwardly extending damper support bracket 21, also of generally U-shaped conformation, includes spaced upper and lower legs 22, 23, connected by a base portion 24. The legs 22, 23 extend outwardly through the slots 15, 16, respectively, and lie in engagement with the upper and lower legs 19, 20 of the short legged outer bracket 17. The outer bracket 17 is centrally apertured at 25 to provide a bearing for the damper drive shaft 14.

The upper and lower legs 19, 20 of the outer bracket are provided with spaced, threaded apertures 19', 20' for the reception of machine screws 26. The upper and lower legs 22, 23 of the damper support bracket are provided with repeated sets of spaced apertures 27, the sets of apertures being spaced to align with the apertures 19', 20' of the legs 19 and 20.

It will be understood that the machine screws may be passed through any one of the sets of apertures 27 and threaded into the apertures 19' or 20', thus variably to space the base 24 of the damper support bracket from the mounting plate or flange 11.

The base portion 24 of the damper support bracket carries at a central position a bearing member 28, including a stub shaft 29. A first, generally rectangular damper section 30 is riveted, as by rivets 31, to the stub shaft 29.

The damper section 30 has a free end 32 directed toward the dirve shaft 14. A similar damper section 33 is riveted, as by rivets 34, to the drive shaft 14, the damper segment 33 having a free end 35 directed toward the stub shaft 29. It will be appreciated that the damper segments are disposed in overlapping position. The main body portions of the damper segments 30 and 33 are essentially planar, the damper segment 30 including upper and lower margin segments bent slightly and in opposite directions from the plane of the damper segment 30. Similarly, damper segment 33 includes upper and lower margin portions 38, 39 bent in the same manner as margin segments 36, 37.

Figure 3:
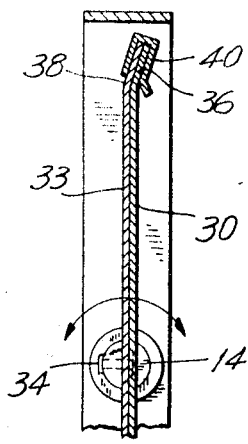
FIGURE 3 is a fragmentary section taken on the line 3—3 of FIGURE 2.

As best seen in FIGURE 3, the planar and margin portions of the inner and outer damper segments are disposed in intimately engaging, overlapping position, the segments being slidably supported in such overlapping position by upper and lower spring clips 40 which are yieldably stressed over the overlapped upper margins 36, 38, and the overlapped lower margins 37, 39.

The operation of the device will be apparent from the preceding description.

For the installation of the device in a duct D, a wall W of the duct D is formed with a vertically directed slot S extending substantially the entire height of the duct. The damper support bracket 21 is inserted through the slot S until the inner surface of the flange 11 is flush with the outer surface of the wall W. The width of the slot is sufficiently great to permit the base 17 and the outer bracket to pass therethrough.

When the flange 11 is positioned against the wall in the manner described, the flange is mounted to the wall by any suitable means, such as sheet metal screws extending through the mounting apertures 41 formed in the flange. After the flange has been mounted in the manner set forth, the upper and lower legs 22, 23 are pressed inwardly forcing the base 24 of the damper support bracket progressively toward the wall of the duct which is parallel with the wall W. The bracket is formed the full width of the duct and finally positioned in a manner that the outermost edge of the bracket terminates just short of the said opposite wall.

Thereafter, mounting machine screws are passed through the innermost aligning apertures 27 in the upper and lower legs 23 and threaded into the upper and lower apertures 19' and 20'. In this manner, the damper support bracket is firmly mounted without any bearing connection between the end of the damper remote from the motor assembly and the adjacent duct wall.

Obviously, instead of spaced sets of apertures 27 in the damper mounting bracket, there may be substituted a longitudinally extending slot, which slot will permit attachment of the mounting bracket to the legs 19, 20 at an infinite variety of positions rather than at the finite series of positions dictated by the spacing of apertures 27.

It will be understood that in the course of extending (or contracting) the damper mounting bracket, the degree of overlap of the damper segments will vary.

In view of the bent conformation of the damper segments under the constraining influence of the spring clips 40, no relative tilting of the damper segments will be permitted.

It will be appreciated that the lengthwise adjustment of the damper may be accomplished before mounting the unit in the duct. It is, however, an advantage of the present device that extension may be effected after the flange 11 is fixed to a side of the duct.

A principal advantage which inheres in permitting subsequent adjustment is the fact that, due to buckling or bowing of the duct walls, the transverse dimensions of ducts are seldom precisely constant throughout the length of a duct. By permitting subsequent adjustment, it is possible for the damper to extend as nearly as possible across the entire width of the duct, notwithstanding variations of the duct from established standards.

From the foregoing it will be seen that there is provided a motorized damper assembly which may be mounted from one wall only of a duct, thus obviating the necessity for severing a duct segment.

Since no part of the damper assembly is required to touch any other than the mounting wall, the likelihood of rattling is substantially reduced.

Further, only a limited number of stock sizes are required, in view of the ability of the user to extend or contract the length of the damper and mounting bracket, thus effecting economies.

Obviously, after the damper has been permanently mounted, it is possible to cut off any protruding portions of the damper support bracket.

In use, the motors are controlled by an electrical servosystem which is effective to operate the motor and align the blades at any selected angle relative to the duct.

While the damper device is shown as two separate parts connected by spring clips, it will be readily recognized that the marginal edges of one of the damper segments may be folded to define a channel, within which the other damper segment is slidably received, thus slidably to maintain the segments in the desired coplanar alignment.

Having thus described the invention and illustrated its use, what is claimed as new and is desired to be secured by Letters Patent is:

1. A motorized damper assembly adjustable to ducts of different widths comprising a mounting flange, operator motor means including a speed reducer carried on one side of said flange, said motor means having a damper actuator shaft extending through said flange, a damper support bracket extending to the other side of said flange, said bracket having a base portion in spaced parallel relation to said flange, bearing means on said base portion in coaxial alignment with said shaft, adjustment means interposed between said flange and said bracket for variably spacing said flange and base portion, and an extensible damper blade member including first and second, slidably connected, overlapping damper segments, one said segment being fixed to said shaft and the other said segment being fixed to said bearing means.

2. A device in accordance with claim 1 and including spring connector means engaging said first and second segments for yieldably supporting said segments in said overlapped position.

3. A device in accordance with claim 2 wherein said damper segments include mating margin portions bent at an angle to the main body portion of said segments, said mating portions maintaining said segments against relative tilting in the plane of said segments.

4. A device in accordance with claim 1 wherein said flange includes mounting means for attachment to a wall portion of a duct, said mounting means of said flange providing the sole connection between said damper assembly and duct.

5. A motorized damper assembly adjustable for ducts of varying widths comprising a mounting flange, operator motor means including a speed reducer carried on one side of said flange, said motor means having a damper actuator shaft extending through said flange, a pair of clearance slot portions formed through said flange, said slot portions being disposed substantially equidistant from said shaft, a damper support member comprising a generally U-shaped bracket including spaced parallel legs and a connecting base portion, the ends of said legs of said bracket remote from said base slidably extending through said slot portions, adjustable fastener means on said one side of said flange adjacent said slot portions for attachment to said legs of said bracket at a variety of positions, thereby to vary the spacing of said flange from said base, bearing means on said base in coaxial alignment with said actuator shaft, a first damper portion fixed to said bearing means and extending toward said shaft, a second damper portion fixed to said shaft and extending toward said bearing means, and damper connector means supporting said damper portions in slidable, partly overlapped position, the degree of overlap and, hence, the effective combined length of said damper portions varying in accordance with the spacing of said base from said flange.

6. A device in accordance with claim 5 and including spring connector means engaging said first and second segments for yieldably supporting said segments in said overlapped position.

References Cited

UNITED STATES PATENTS 1,926,120  9/1933  Snediker.
2,285,829  6/1942  Maage _____ 251—305
3,381,601  5/1968  McCabe _____ 98—121

MEYER PERLIN, Primary Examiner

U.S. Cl. X.R.
98—121; 251—305